United States Patent
Sturdevant et al.

[19]

[11] Patent Number: 5,997,737
[45] Date of Patent: Dec. 7, 1999

[54] PORTABLE SKID MOUNTED DESALINATION APPARATUS

[75] Inventors: William E. Sturdevant, West Columbia, Tex.; Vernon Jack Guidry, II, Morgan City, La.

[73] Assignee: Moreno International, L.L.C., Lafayette, La.

[21] Appl. No.: 09/127,387

[22] Filed: Jul. 31, 1998

[51] Int. Cl.[6] ............................... C02F 9/00; C02F 1/32; C02F 1/44

[52] U.S. Cl. ...................... 210/170; 210/198.1; 210/205; 210/237; 210/241; 210/257.2; 210/259

[58] Field of Search ................................... 210/170, 237, 210/241, 198.1, 259, 205, 257.2

[56] References Cited

U.S. PATENT DOCUMENTS

| | | |
|---|---|---|
| 5,174,901 | 12/1992 | Smith . |
| 5,244,579 | 9/1993 | Horner . |
| 5,512,178 | 4/1996 | Dempo . |
| 5,520,816 | 5/1996 | Kuepper . |
| 5,547,584 | 8/1996 | Capehart . |
| 5,632,892 | 5/1997 | Klein . |
| 5,741,416 | 4/1998 | Tempest, Jr. . |

OTHER PUBLICATIONS

Brochure: C'Treat Floating Production Systems.
Brochure: C'treat Products & Services.
Brochure: Filmtec Seawater RO Elements.
Brochure: Applied Membranes, Inc. Multi–Media Filters.

*Primary Examiner*—Timothy M. Lithgow
*Attorney, Agent, or Firm*—William W. Stagg

[57] ABSTRACT

In a offshore oil and gas platform located over seawater in an open sea environment, the platform having drilling equipment, crew quarters, and a potable water holding tank for holding potable water, a portable desalination apparatus for producing potable water from seawater. The apparatus is comprised of a support skid to which is mounted a plurality of removable lifting lugs. A pump with associated piping and valves are fixed to the skid for collecting seawater from the open sea environment. Additional piping and valves are provided for moving seawater from the pump to a seawater filter. Additional piping and valves are used for moving the filtered seawater to a plurality of first pressure vessels each having reverse osmosis elements to produce a first quantity of brine water and a first quantity of desalinated water from the filtered seawater. Other piping and valves are used to move the first quantity of brine water to a second plurality of pressure vessels, each of the second pressure vessels also has reverse osmosis elements to produce a second quantity of brine water and a second quantity of desalinated water. Additional piping and valves are used for discharging the second quantity of brine water to a disposal system and collecting and transporting the first and second quantities of desalinated water an ultraviolet light chamber to expose the desalinated water to ultraviolet light to produce potable water. Structure is provided for discharging the potable water to the potable water holding tank of the platform.

14 Claims, 4 Drawing Sheets

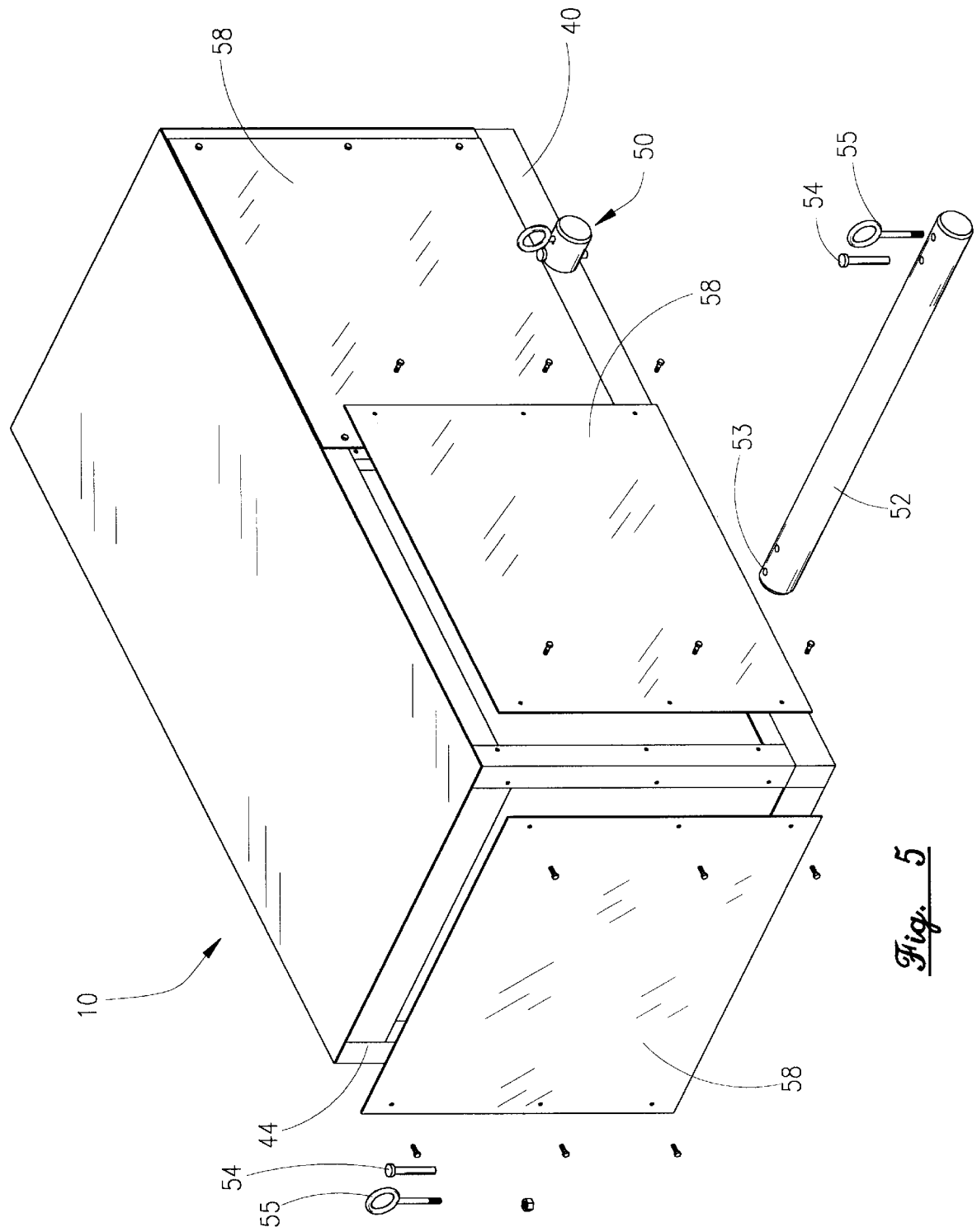

PORTABLE SKID MOUNTED DESALINATION APPARATUS

FIELD OF INVENTION

The present invention generally relates to the field of desalination devices and more particularly is related to a portable, skid mounted apparatus for producing potable water from seawater by membrane separation for use on offshore oil and gas platforms.

BACKGROUND OF INVENTION

The drilling of oil and gas wells in an offshore environment typically requires the use manned drilling platforms over extended periods of time. In order to provide a hospitable environment for the personnel, it is necessary that these drilling platforms be provided with large quantities of potable water for use be the personnel manning the platforms. Providing such water typically involves providing large storage tanks for potable water, these tanks being replenished by water being brought the platforms, or providing bulky, cumbersome, desalination equipment that either utilizes valuable platform space or requires tender vessels to support the equipment. The present invention is designed to provide a high volume, portable desalination apparatus designed to eliminate those problems associated with providing potable water on drilling platforms.

SUMMARY OF INVENTION

The intent of the present invention to provide a self-contained desalinization apparatus for use on offshore oil and gas platforms that is easily transportable and that takes up only a small amount of the platform's available deck space. An essential feature of applicant's apparatus is that all of the essential components of the desalination unit are arranged and housed on a transportable skid. The transportable skid of applicant's desalination apparatus is designed to provide support for the components of the apparatus with a minimal overall "foot print" in order to reduce the amount of platform space required for the apparatus. The skid is equipped with removable lifting lugs. The removable lifting lugs facilitate moving the apparatus to and from the platform and at the same time help to keep the skid "footprint" at minimum.

Housed within the transportable skid is a pump, a water filter, a plurality of high-pressure tanks, each tank containing high-density desalination membranes, an ultraviolet purification chamber, and inlet and outlet valves and piping. In operation, the unit is designed to pump seawater to a filter for primary removal of contaminants. The filtered seawater is then transported to a first series of pressurized reverse osmosis chambers for desalination. This first series of chambers produces a first quantity of desalinated water and a first quantity of concentrated brine water. The first quantity of concentrated brine water is transported to a second series of pressurized reverse osmosis chambers. There a second quantity of desalinated water and a second quantity of concentrated brine water is produced. The second quantity of concentrated brine water is then transported for disposal by piping means back to the sea.

The desalinated water from both the first and the second reverse osmosis chambers is collected in a series of piping and transported to a chamber where it is exposed to ultraviolet radiation for further purification. Finally, the desalination is transported to the platform's portable water storage system. The unit is designed to produce up to 42,000 gallons per day of potable water.

Because all of the essential features of the apparatus are contained in a single unit, applicant's apparatus can be easily added or removed from the piping of the offshore platform's potable water system. The ease of removal allows for the ready replacement with another apparatus. Maintenance on the replaced apparatus can then be conducted away from the offshore platform with little impact on the offshore platform's potable water supply.

BRIEF DESCRIPTION OF THE DRAWINGS

FIG. 5 is a side elevation view of applicant's invention showing the detachable shroud.

DESCRIPTION OF PREFERRED EMBODIMENT

Figure 1:
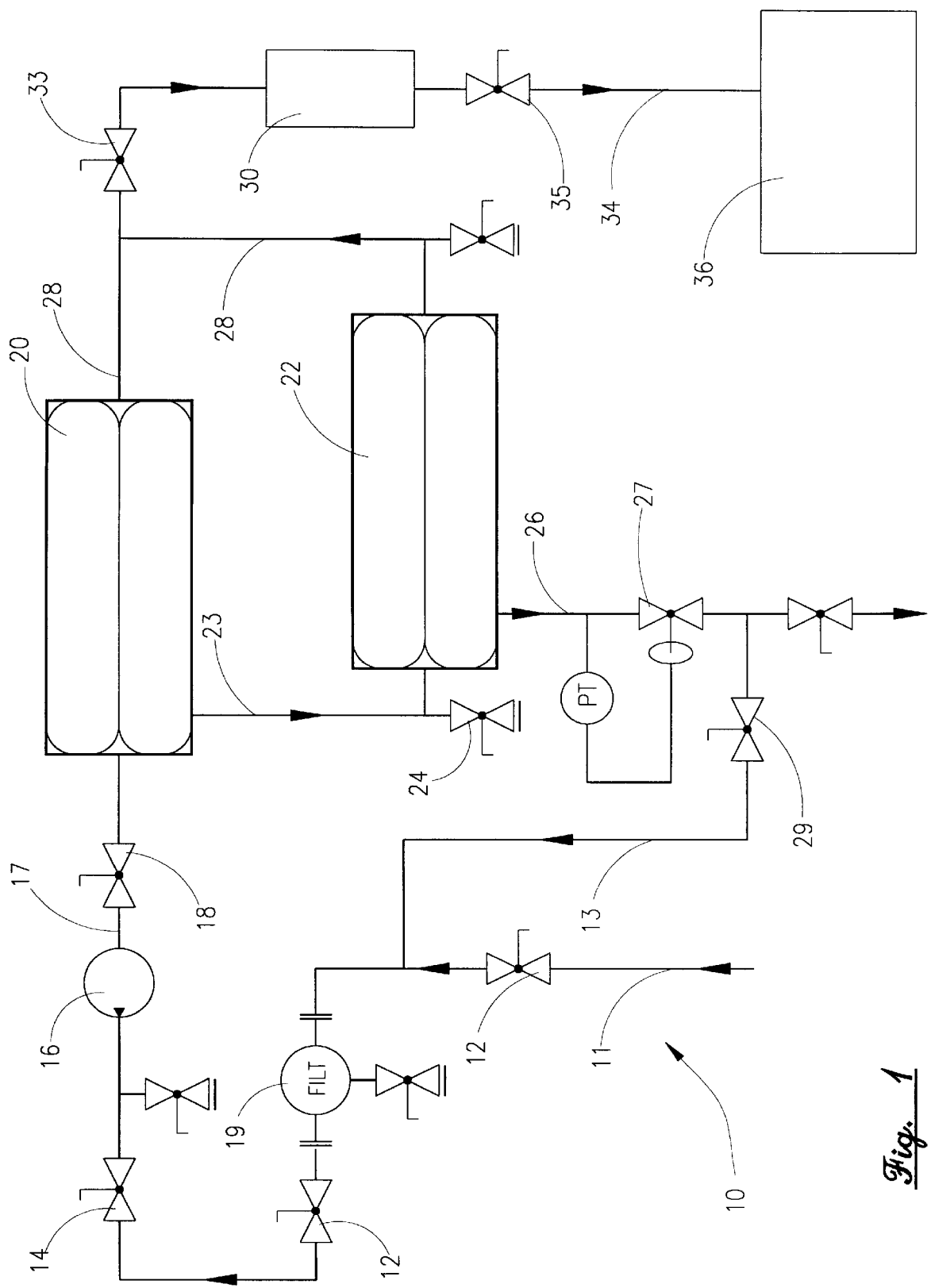
FIG. 1 is a flow chart of the desalination apparatus of applicant's invention

Referring now to the drawings and more particularly to FIG. 1 there is shown a schematic flow chart of applicant's invention 10. In operation, seawater is drawn from the ocean via a feedwater inlet line 11 by means of pump 16 through filter 19. Typically the seawater will have 30,000 to 40,000 ppm total dissolved solids. In the preferred embodiment the pump 16 is a single-stage centrifugal pump and feedwater flow is maintained at a rate of 80 to 120 gpm. Feedwater flow to the pump 16 from the filter 19 is maintained by control valves 12 and 14. The filter 19 is intended to remove impurities from the seawater such as mud, debris and small aquatic life. Many types of currently existing filters would serve this purpose.

After being filtered, the feedwater is then transported to the first reverse osmosis chambers 20 via filtered water line 17. In the preferred embodiment, the chambers 20 are comprised of two pressure vessels tubes arrayed in parallel, each pressure vessel tube having two reverse osmosis elements such as the FILMTEC® SW30HR-380 Seawater RO Element manufactured by FilmTec Corporation. The feedwater in the chambers 20 is maintained at a pressure in the range of 900 psi to 1000 psi in order to maximize the production of desalinated water. The chambers 20 will produce a quantity of desalinated water and a quantity of concentrated brine water. The concentrated brine water is discharged via brine water piping 23 to the second reverse osmosis chambers 22. Flow of the concentrated brine water via piping 23 is controlled by means of control valve 24.

The second reverse osmosis chambers 22 are, in the preferred embodiment, the comprised of two pressure vessel tubes arrayed in parallel in a manner similar to those of the chambers 22. As in the chambers 20, each pressure vessel tube of chambers 22 contain reverse osmosis elements such as the FILMTEC® SW30HR-380 Seawater RO Element. The seawater in the chambers 22 is maintained at a pressure in the range of 900 psi to 1000 psi so as to produce a desired quantity of desalinated water and a quantity of concentrated brine water. The concentrated brine water produced in the chambers 22 is directed to a brine discharge outlet 26 for disposal into the sea or directed back to the feedwater intake line 11 via recycle line 13 and control valve 29 for re-circulation through the apparatus 10. Brine discharge from the apparatus is controlled by means of valve 27. It is expected that concentrated brine water from chambers 22 will be 70 gpm at 970 psi and have total dissolved solids of 51,500 ppm.

The desalinated water from chambers 20 and 22 is directed from each of the chambers via desalinated water line 28 to UV chamber 30 having a plurality of ultraviolet light emitters. There the desalinated water is exposed to ultraviolet light as a final purification means to create potable water. The flow of desalinated water to the UV chamber 30 is controlled by means of control valve 33. It is thought that exposing the desalinated water to light emitters producing ultraviolet light of at least 30,000 uw.sec/cm2 at a flow rate of 30 gpm will be sufficient as a final treatment to produce potable water.

The potable water is then transported from the UV chamber to the potable water storage tank 36 of the platform's potable water system via potable water discharge piping 34 and control valve 35. When in operation, approximately 30 gpm of potable water having less than 500 ppm total dissolved solids will be produced from every 100 gpm of seawater circulated through the apparatus 10.

Figure 2:
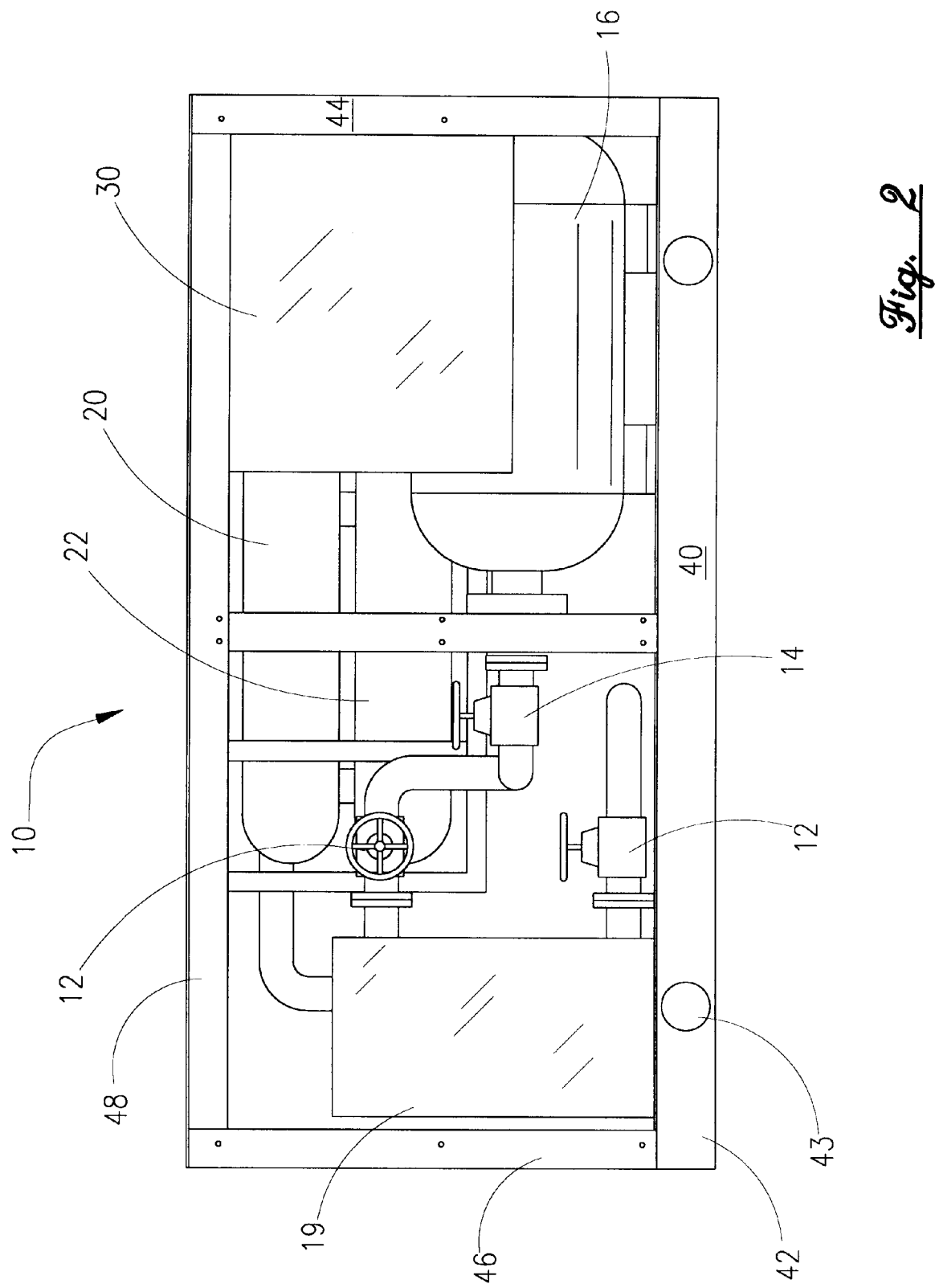
FIG. 2 is a side elevation view of applicant's desalination apparatus.
Figure 3:
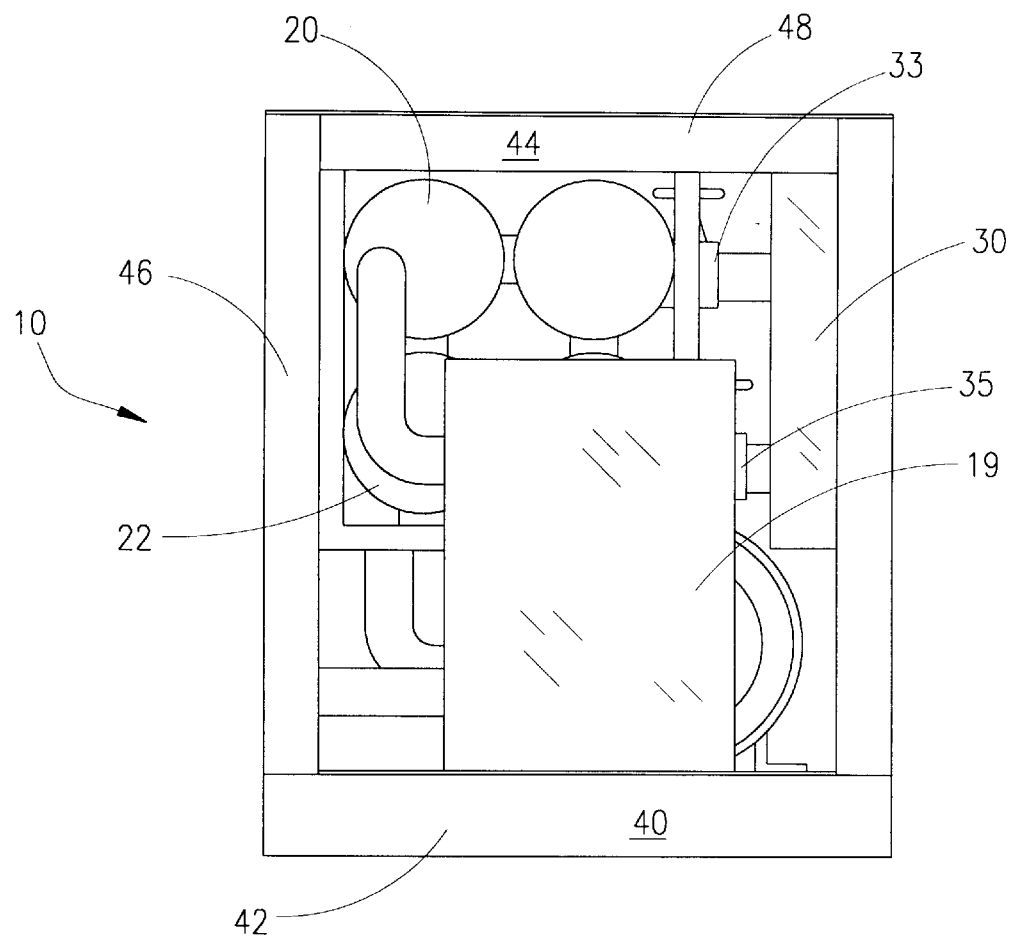
FIG. 3 is an end view of applicant's desalination apparatus.

Referring now to FIG. 2 and FIG. 3, there is shown elevation views of applicant's desalination apparatus 10 mounted on its support skid 40. The support skid 40 is comprised of a base frame 42 to which is attached a framework 44 consisting of a plurality of vertical support members 46 and horizontal support members 48. The pump 16 is mounted to the base frame 42. The seawater filter 19, the reverse osmosis chambers 20 and 22, the UV chamber 30, and the various piping and valves comprising the desalination apparatus are all positioned within and supported by the framework 44 of the support skid 40. The various components of the device are positioned on the base frame 42 of the skid 40 to minimize the "footprint" of the skid on the platform deck.

Figure 4:
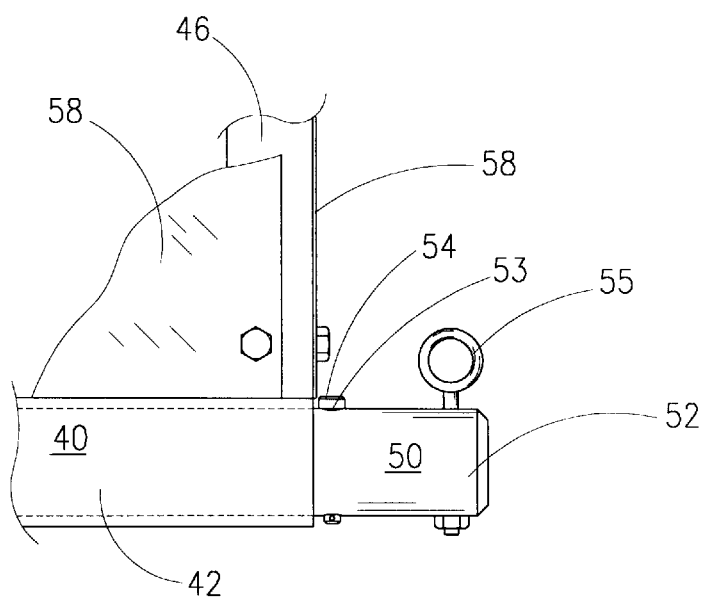
FIG. 4 is partial side view of the support skid of applicant's invention showing the removable lifting lugs.

FIG. 4 shows a partial side view of the base frame 42 of the skid 40 showing the detachable lifting lugs 50. The base frame 42 of the skid 40 has openings 43 for receiving the support member 52. The lifting lugs 50 are comprised of a tubular support members 52 that sized to extend outward on either side from the width of the base frame 42. Each support member 52 has a pair of locking pinholes 53 for receiving a locking pin 54. The locking pins 54, once inserted, keep the support member 52 from sliding through the openings 43 and serve to hold the support member 52 in place on the base frame 42. Removable lifting eyes 55 are threadably mounted to each end of the support member 52 to provide a means for securing lifting lines to allow the skid 40 and the enclosed desalination apparatus to be moved on and off the platform and around the platform deck. When in place on the deck of the platform, the lifting lugs 50 are removed to keep the "footprint" of the skid 40 to a minimum.

When the apparatus 10 is transported to and from a platform, there is shown in FIG. 5 a removable shroud 58 mounted to the skid 40. The shroud 40, detachably mounted to the framework 44 of the skid 40 by bolts or other means, protects the apparatus 10 from damage during the transporting process.

It is thought that the portable, skid mounted desalination apparatus of the present invention and many of its attendant advantages will be understood from the foregoing description. It is also thought that it will be apparent that various changes may be make in the form, construction and arrangement of the parts the desalination apparatus without departing from the spirit and scope of the invention or sacrificing all of its material advantages. The form of the apparatus described herein is merely a preferred or exemplary embodiment of the invention.

We claim:

1. In an offshore oil and gas platform located over seawater in an open sea environment, said platform having drilling equipment and crew quarters, said platform further having a potable water holding tank for holding potable water for use in said crew quarters, a portable desalination apparatus for producing potable water from seawater comprising:

a) a support skid, said support skid having a lower horizontally orientated base frame and an upper framework of vertically and horizontally orientated support members;

b) a plurality of removable lifting lugs mounted to said support skid;

c) a pump mounted to said base frame of said skid within said upper framework, said pump having an inlet end and outlet end;

d) means for connecting said pump inlet to a seawater inlet line, said seawater inlet line having a first end position to contact said seawater and a second end mounted to said inlet end of said pump so as to allow a quantity of said seawater to be drawn from said open sea environment through said pump;

e) a seawater filter mounted to said skid within said upper framework, said filter having an inlet end and an outlet end;

f) a pump discharge line, said pump discharge line mounted to said outlet end of said pump and said inlet end of said filter so as allow said quantity of seawater to be pumped through said seawater filter to produce a quantity of filtered seawater;

g) a first reverse osmosis chamber mounted to said skid within said upper framework, said first reverse osmosis chamber having a filtered seawater inlet, a brine water outlet and a desalinated water outlet;

h) a seawater line extending from said outlet end of said filter to said filtered seawater inlet of said first reverse osmosis chamber so as to allow said filtered seawater to be introduced into said first reverse osmosis chamber and thereby produce a first quantity of brine water and a first quantity of desalinated water from said filtered seawater;

i) a second reverse osmosis chamber mounted to said skid within said upper framework, said second reverse osmosis chamber having a brine water inlet, a brine water outlet, and a desalinated water outlet;

j) a first brine water discharge line, said first brine water discharge line having first and second ends, said first end of said first brine water discharge line being connected to said brine water outlet of said first reverse osmosis chamber and said second end of said first brine water discharge line being connected to said brine water inlet of said second reverse osmosis chamber so as to introduce said first quantity of brine water into said second reverse osmosis chamber and thereby produce a second quantity of brine water and a second quantity of desalinated water;

k) a second brine water discharge line, said second brine water discharge line having first and second ends, said first end of said second brine water discharge line connected to said brine water outlet of said second reverse osmosis chamber so as to allow said second quantity of brine water to be discharged from said second reverse osmosis chamber through said second end of said second brine water discharge line for disposal;

l) an ultraviolet light chamber mounted to said skid within said upper framework, said ultraviolet light chamber having a lighting system for emitting ultraviolet light, said ultraviolet light chamber having a desalinated water inlet and a potable water outlet;

m) a desalinated water line, said desalinated water line having a plurality of desalinated water inlets, a selected one of said desalinated water inlets being connected to said desalinated water outlet of said first reverse osmosis chamber and a selected one of said desalinated water inlets being connected to said desalinated water outlet of said second reverse osmosis chamber, and an outlet end connected to said desalinated water inlet of said ultraviolet light chamber so as to introduce said first and second quantities of desalinated water into said ultraviolet light chamber so as to expose said quantities of desalinated water to said emitted ultraviolet light in said ultraviolet light chamber and thereby producing a quantity of potable water from said quantities of desalinated water; and n) means for connecting said potable water outlet of said ultraviolet light chamber to said potable water holding tank of said platform so as to allow the discharge of said quantity of potable water from said ultraviolet light chamber.

2. The desalination apparatus as recited in claim 1, further comprising:

a) a plurality of valves positioned on said seawater inlet line for controlling the flow of seawater to and from said pump;

b) a valve positioned on said first brine water discharge line for controlling said introduction of said first quantity of brine water into said second reverse osmosis chamber;

c) a valve positioned on said second brine water discharge line for controlling said discharge of said second quantity of brine water from said second reverse osmosis chamber;

d) a valve positioned on said desalinated water line for controlling said introduction of desalinated water into said ultraviolet light chamber; and e) a valve means for controlling said discharge of potable water from said ultraviolet light chamber.

3. The desalination apparatus as recited in claim 1, wherein the pressure of the filtered seawater in said first reverse osmosis chambers is maintained between 900 and 1000 psi.

4. The desalination apparatus as recited in claim 1, wherein the pressure of the first quantity of brine water in said second reverse osmosis chambers is maintained between 900 and 1000 psi.

5. The desalination apparatus as recited in claim 2, wherein the pressure of the first quantity of brine water in said second reverse osmosis chambers is maintained between 900 and 1000 psi.

6. The desalination apparatus as recited in claim 4, wherein said lighting system of said ultraviolet light chamber emits ultraviolet light of at least 30,000 uw.sec/cm$^2$.

7. The desalination apparatus as recited in claim 1, wherein said lower base of said skid has a plurality of openings extending through said lower base, each opening being sized to receive a support member, each support member being of a length sufficient to allow said support member to extend a desired distance from the edge of said lower base on each side of said skid, each of said support members having means for temporarily holding said support members in a desired position on said lower base of said skid.

8. The desalination apparatus as recited in claim 7, wherein said means for temporarily holding said support members in a desired position on said lower base of said skid includes providing holes in said support members for the insertion of locking pins on both sides of said skids.

9. The desalination apparatus as recited in claim 7, wherein removable lifting eyes are threadably mounted to each end of each of said support members so as to provide a means for securing lifting lines to said skid.

10. The desalination apparatus as recited in claim 8, wherein said skid has a removable shroud mounted around said upper framework of said skid.

11. The desalination apparatus as recited in claim 4, wherein said first and second reverse osmosis chambers are comprised of a plurality of horizontally positioned pressure vessels, each of said vessels having a semi-permeable reverse osmosis membrane, said pressure vessels being connected to each other in a parallel manner so as to allow the simultaneous production of desalinated water from said vessels.

12. In an offshore oil and gas platform located over seawater in an open sea environment, said platform having drilling equipment and crew quarters, said platform further having a potable water holding tank for holding potable water for use in said crew quarters, a portable desalination apparatus for producing potable water from seawater comprising:

a) a support skid;

b) a plurality of removable lifting lugs mounted to said support skid;

c) pump, piping and valve means mounted to said skid for collecting seawater from said open sea environment;

d) piping and valve means for moving seawater from said pump to a seawater filter mounted to said skid to produce filtered seawater;

e) piping and valve means for moving said filtered seawater to a plurality of first pressure vessels, each of said first pressure vessels having reverse osmosis elements, so as to produce a first quantity of brine water and a first quantity of desalinated water from said filtered seawater;

f) piping and valve means for moving said first quantity of brine water to a plurality of second pressure vessels, each of said second pressure vessels having reverse osmosis elements, so as to produce a second quantity of brine water and a second quantity of desalinated water;

g) piping and valve means for discharging said second quantity of brine water to a disposal system;

h) piping and valve means for collecting said first and second quantities of desalinated water;

i) piping and valve means for transporting said quantities of desalinated water to an ultraviolet light chamber for exposing said quantities of desalinated water to ultraviolet light and thereby producing potable water; and j) means for discharging said potable water to said potable water holding tank of said platform.

13. The desalination apparatus as recited in claim 12, wherein said skid is comprised of a rectangular lower base frame, an upwardly extending upper framework comprised of a plurality of vertical and horizontal support members, and wherein said plurality of removable lifting lugs are comprised of a plurality of support members, each of said support members extending through an opening hole running through said lower base frame, said support members being fixed to said lower base frame by means of removable locking pins fitted into said support members on either said of said lower base frame.

14. The desalination apparatus as recited in claim 13, wherein said skid has a detachable shroud mounted over said upper framework.

* * * * *